United States Patent
Pross et al.

(10) Patent No.: US 8,572,299 B2
(45) Date of Patent: Oct. 29, 2013

(54) HARDWARE ACCELERATOR MODULE AND METHOD FOR SETTING UP SAME

(75) Inventors: Uwe Pross, Chemnitz (DE); Tobias Weber, Limbach-Oberfrohna (DE); Gunnar Nitsche, Radebeul (DE); Thomas Fliess, Dresden (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 0 days.

(21) Appl. No.: 13/251,323

(22) Filed: Oct. 3, 2011

(65) Prior Publication Data

US 2012/0084543 A1  Apr. 5, 2012

(30) Foreign Application Priority Data

Oct. 1, 2010  (EP) ..................................... 10185896

(51) Int. Cl.
  *G06F 5/00* (2006.01)
  *G06T 1/00* (2006.01)
(52) U.S. Cl.
  USPC .......................................... 710/52; 345/503
(58) Field of Classification Search
  USPC ........................................................ 710/52
  See application file for complete search history.

(56) References Cited

U.S. PATENT DOCUMENTS

| | | | | |
|---|---|---|---|---|
| 5,664,162 A | * | 9/1997 | Dye | 345/532 |
| 6,515,670 B1 | * | 2/2003 | Huang et al. | 345/503 |
| 7,693,929 B2 | * | 4/2010 | Giacalone | 708/650 |
| 8,284,844 B2 | * | 10/2012 | MacInnis et al. | 375/240.25 |
| 2011/0249022 A1 | * | 10/2011 | Poornachandran et al. | 345/619 |

OTHER PUBLICATIONS

European Search Report for EP11183354.7-1243, dated Dec. 27, 2011.

* cited by examiner

*Primary Examiner* — Titus Wong
(74) *Attorney, Agent, or Firm* — SpryIP, LLC

(57) ABSTRACT

A hardware accelerator module is driven by a system processor via a system bus to sequentially process data blocks of a data stream as a function of a parameter set defined by the processor. The module includes a register block adapted to receive parameter sets from the system processor, an accelerator core adapted to receive streaming data, to process data blocks of said streaming data in a manner defined by a parameter set, and to output processed streaming data, and a parameter buffering block adapted to consecutively store a plurality of parameter sets and to sequentially provide the parameter sets to the hardware accelerator core as a function of a busy state of the hardware accelerator core. The parameter buffering block enables to reduce downtimes of hardware accelerators, to increase data throughput, and to reduce the risk of a processor overload in a processor which drives several hardware accelerators.

4 Claims, 6 Drawing Sheets

HARDWARE ACCELERATOR MODULE AND METHOD FOR SETTING UP SAME

CROSS REFERENCE TO RELATED APPLICATIONS

This application claims priority of European application No. 10185896.7 filed on Oct. 1, 2010, the entire contents of which is hereby incorporated by reference herein.

FIELD OF THE INVENTION

The invention relates to a hardware accelerator module, and moreover relates to a method for setting up a hardware accelerator module.

BACKGROUND OF THE INVENTION

Data processing is often accelerated by using dedicated hardware modules known as hardware accelerators. These hardware modules are accessed and set up by the system software that runs on a processor via a programming interface, usually registers. Before a hardware accelerator can process a data stream it has to be setup by the software.

FIG. 1 shows a timing chart of conventional operation of a hardware accelerator which is described in conjunction with the block diagram of a conventional hardware accelerator module shown in FIG. 2. Hardware accelerator module 2 is accessed by a system processor, not shown, through a dedicated bus to program a set of parameters for one processing task of the hardware accelerator core 22. After writing several parameter registers, at (a), the processor triggers the hardware accelerator to start, at (b). The hardware accelerator core has to wait for a start signal (c) from register interface 21 to start processing data at time $t_1$, as shown at (d) in FIG. 1. Now the processor has to wait until the hardware accelerator core has finished its task, which is detected at time $t_2$ by a falling edge of the busy signal (d) returned by hardware accelerator core 22, before it can program a new parameter set for processing a next data block of a data stream. It is obvious that these downtimes of the accelerator core significantly limit the throughput of the accelerator module.

Currently, parameters for the hardware accelerator are either directly programmed by the system software or stored in a separate RAM. The first case requires the hardware accelerator to be programmed after each processing cycle. The use of a separate parameter RAM is intended to reduce bus load under different recurrent processing conditions. When using a separate parameter RAM, such as e.g. described in U.S. Pat. No. 6,842,844, the software can program parameters for different processing conditions in advance, and the hardware accelerator may use these sets afterwards for several times. However, the hardware accelerator has still to be programmed after each processing cycle. Moreover, employing a separate parameter RAM is not transparent for the system software, which is to say that the processor has still to tell the hardware accelerator which parameter set to use.

An object of the invention is to reduce downtimes and increase data throughput of hardware accelerators. Another object of the invention is to reduce the risk of processor overload in a processor which drives several hardware accelerators.

SUMMARY OF THE INVENTION

According to the invention there is provided a hardware accelerator module as set forth in claim 1 and a method for setting up a hardware accelerator module as set forth in claim 3.

The hardware accelerator module of the invention is driven by a system processor via a system bus to sequentially process data blocks of a data stream in function of a parameter set defined by the processor, and comprises a register interface block adapted to receive a parameter set from the system processor; and an accelerator core adapted to receive streaming data, to process data blocks of said streaming data in a manner defined by said parameter set, and to output the processed streaming data. According to the invention, the hardware accelerator module further comprises a parameter buffering block adapted to consecutively store a plurality of parameter sets and to sequentially provide the parameter sets to the hardware accelerator core in function of a busy state received from the hardware accelerator core.

The parameter buffering block may comprise a first finite state machine adapted to receive a first start pulse from the register interface block and in response thereto to pass another start pulse to the accelerator core as soon as a non-busy condition of the accelerator core is determined; a second finite state machine adapted to receive and assess a first busy signal from the accelerator core to determine a non-busy condition thereof, and to pass a second busy signal to the system processor; a FIFO buffer having a depth N, for storing N parameter sets, and a parameter output register adapted to provide a current set of parameters to the accelerator core simultaneously with the other start pulse, wherein said second busy signal only reflects a non-busy state to the processor if the first busy signal indicates a non-busy condition and the parameter FIFO is empty.

According to another aspect of the invention there is provided a method for setting up a hardware accelerator module comprising the steps of: writing, by a system processor, a first parameter set into the hardware accelerator module which first parameter set defines a first processing task of a hardware accelerator core, and emitting a first start pulse; consecutively writing, by the system processor, a second parameter set into the hardware accelerator module which second parameter set defines a second processing task of the hardware accelerator core, wherein the writing step occurs independently from a busy status of the hardware accelerator core, and emitting a second start pulse; sequentially buffering the parameter sets in a parameter buffer; monitoring, by said parameter buffer, a first busy signal from the hardware accelerator core of the hardware accelerator module; in case the hardware accelerator core is not busy, immediately passing a start pulse to the hardware accelerator core in response to the first start pulse, and providing a first parameter set to the hardware accelerator core; in case the hardware accelerator core is busy, buffering the start signal until a non-busy indication is detected from the hardware accelerator core, and a start pulse to the hardware accelerator core and providing the first parameter set to the hardware accelerator core in response to said non-busy indication; and returning a second busy signal to the processor wherein said second busy signal only indicates a non-busy state of the hardware accelerator module if the first busy signal indicates a non-busy condition of the hardware accelerator core and there is no further parameter set buffered in the parameter buffer, and otherwise indicates a busy state.

In a preferred embodiment, the method for setting up a hardware accelerator module further comprises the step of registering a status signal which indicates at least one status of the parameter buffer of a group of status indications including the parameter set currently used, the space available in the parameter buffer, and a buffer overflow condition.

The parameter buffering block of the invention advantageously provides for an increase in throughput and utilization of the hardware accelerator, since parameter sets are available at the hardware accelerator core to perform seamless processing of consecutive streaming data packets. The configuration data can be calculated and provided to the hardware in advance, making dispensable an immediate reaction of the processor upon completion of a processing task by a hardware accelerator, so that processor load peaks due to hardware interrupts are reduced.

Furthermore, energy consumption is reduced since with the parameter buffering block of the invention the processor can be put to sleep for a longer time which is more efficient.

BRIEF DESCRIPTION OF THE DRAWING FIGURES

Additional features and advantages of the present invention will be apparent from the following detailed description of specific embodiments which is given by way of example only and in which reference will be made to the accompanying drawings, wherein.

DETAILED DESCRIPTION OF A PREFERRED EMBODIMENT

Figure 1:
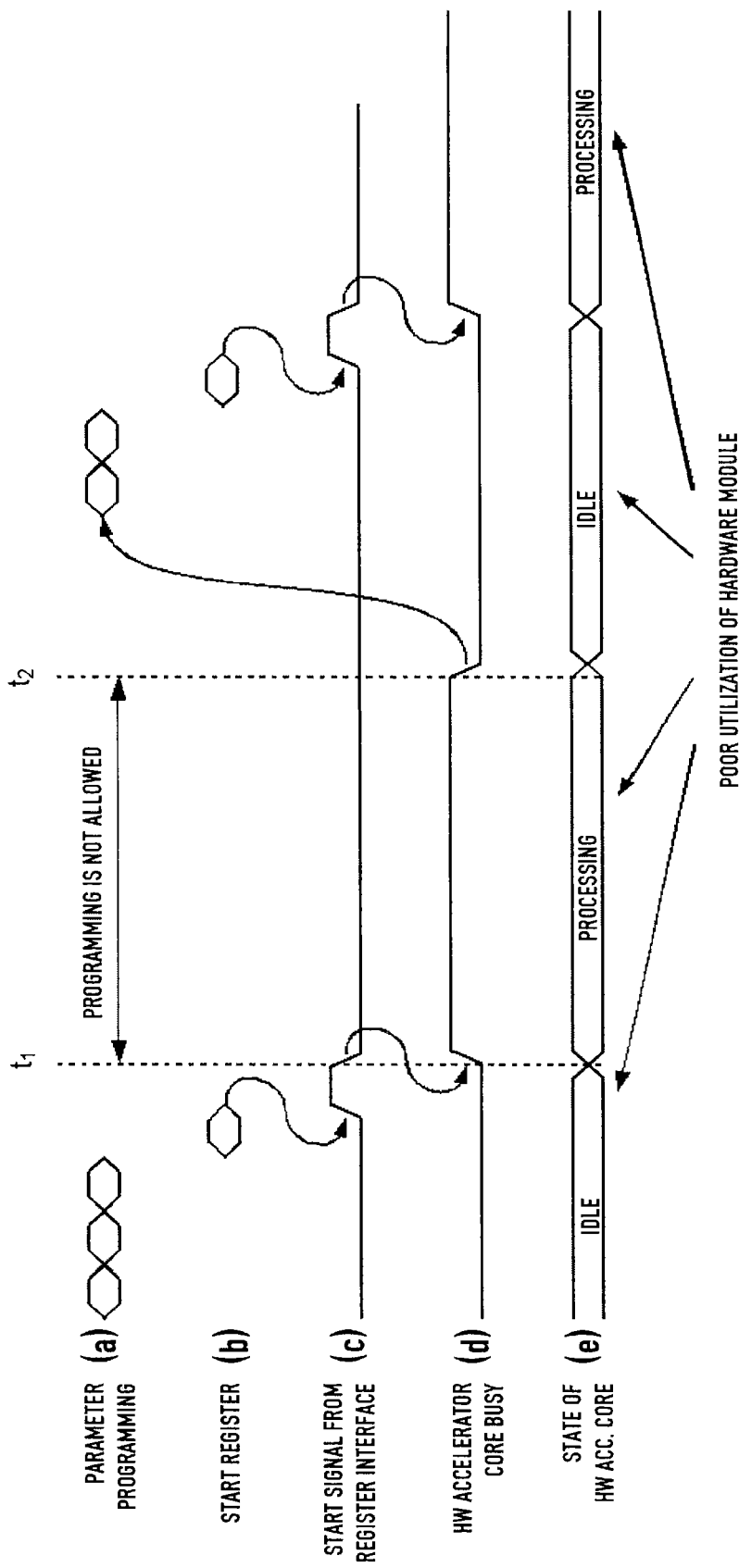
FIG. 1 shows a timing chart of the conventional operation of a hardware accelerator module.
Figure 2:
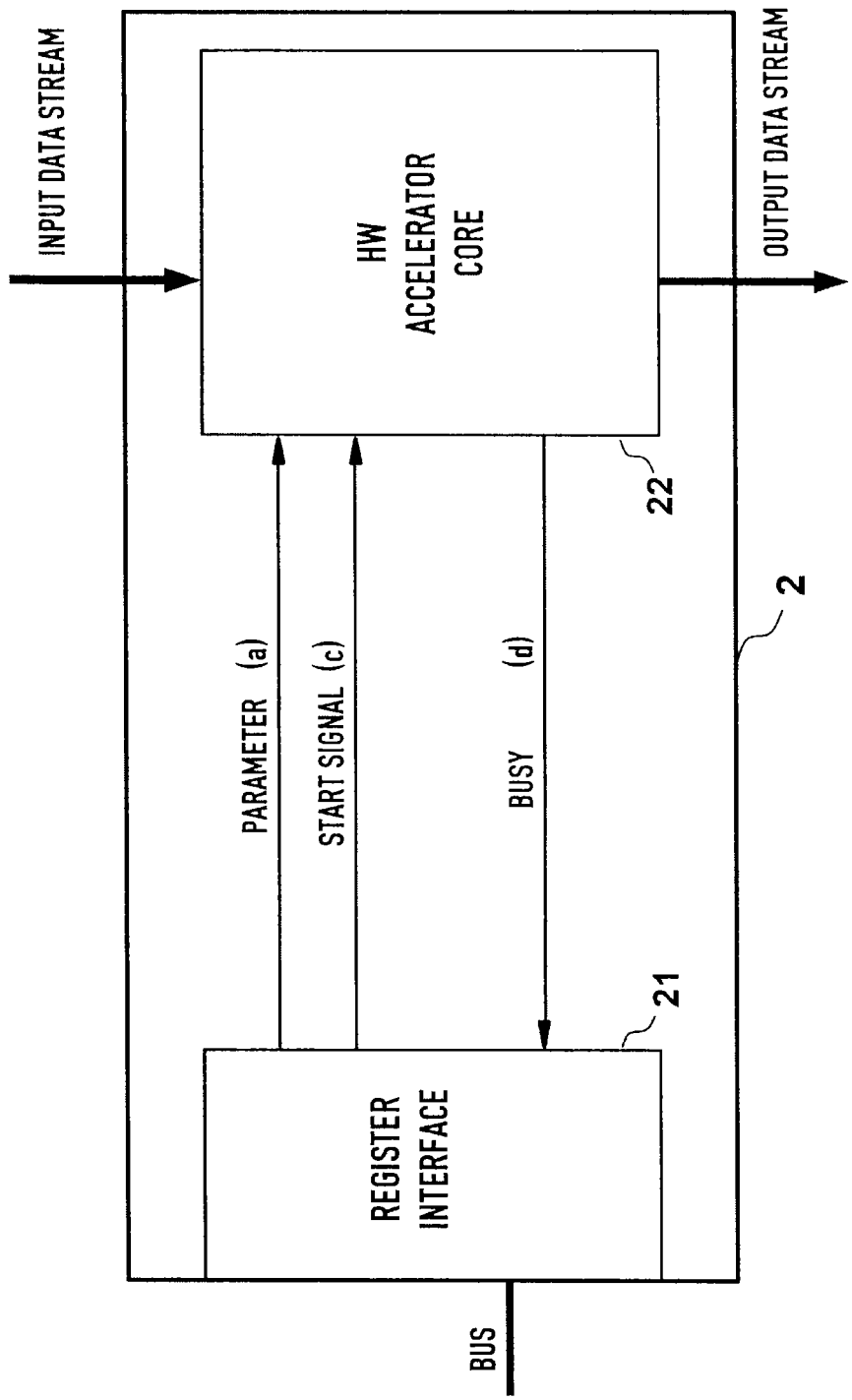
FIG. 2 illustrates a schematic block diagram of a conventional hardware accelerator module.
Figure 3:
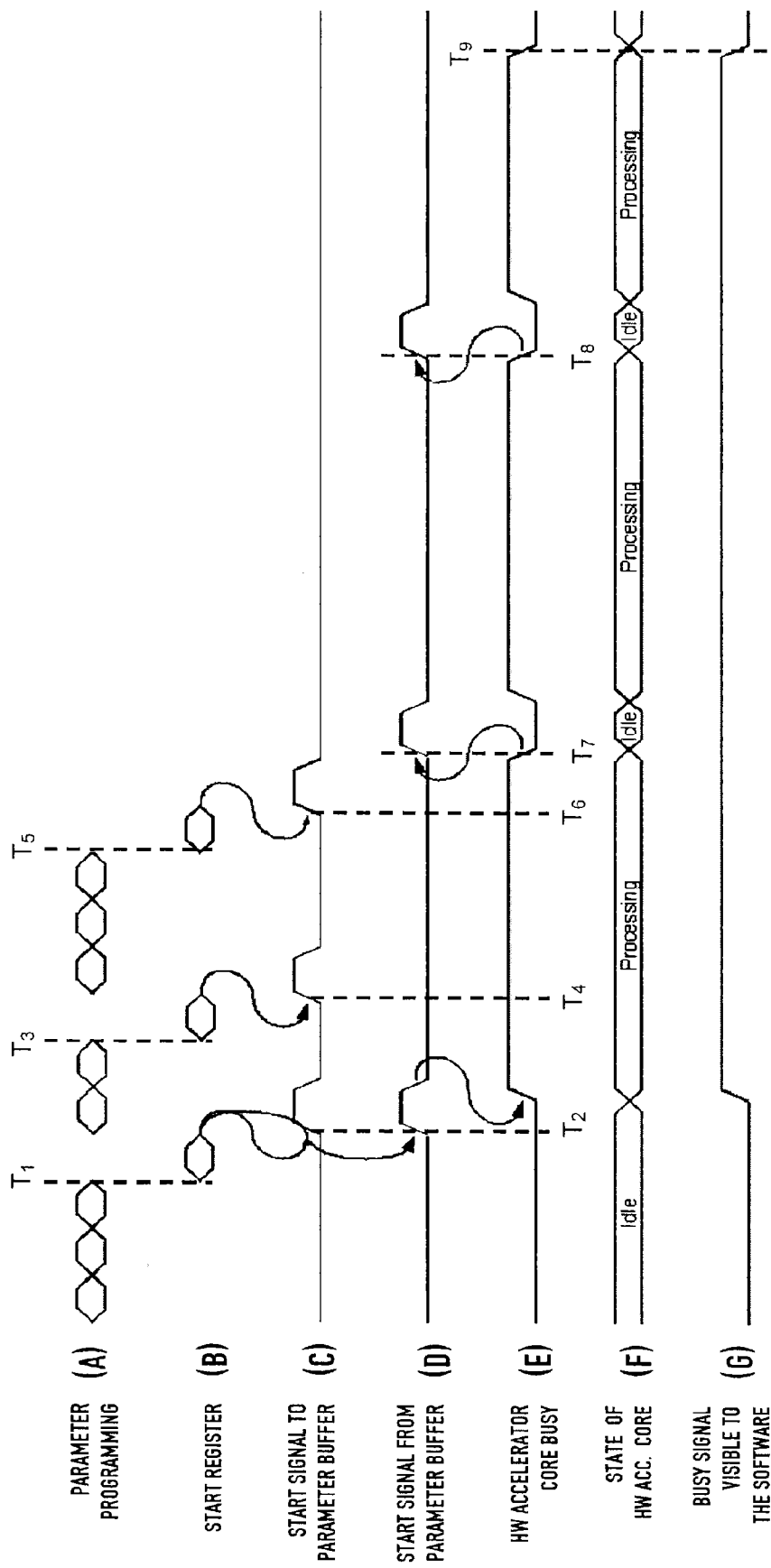
FIG. 3 shows a timing chart of the operation of a hardware accelerator module according to the invention.

FIG. 3 shows a timing chart of the operation of a hardware accelerator module according to the invention. The description thereof should be read in conjunction with FIG. 4 which shows a schematic block diagram of the hardware accelerator module 4 according to the invention.

The hardware accelerator module 4 receives parameters and driving signals from software which runs on a system processor, not shown, via bus 30. Hardware accelerator module 4 comprises a register interface block 40, a parameter buffering block 50, and an accelerator core 60. Accelerator core 60 receives a data stream, processes blocks of streaming data according to a set of parameters defined by the processor software, and outputs the processed streaming data, as illustrated by bold vertical arrows in FIG. 4.

At (A), the processor writes a first parameter set into register interface 40 and triggers the register, at (B), to start, at time $T_1$. Then the processor writes a second parameter set and again triggers the register to start, at time $T_3$, and writes a third parameter set and again triggers the register to start, at time $T_5$, and so on. With the accelerator module according to the invention, the processor does not have to wait until the hardware accelerator core has finished a task to program a subsequent parameter set, as will be understood from the description below.

In response to each trigger event (B), register interface block 40 outputs a start pulse (C) to parameter buffer 50. Parameter buffer 50 receives a busy signal (E) from hardware accelerator core 60.

If signal (E) is low, i.e. the accelerator core 60 is not busy, which is the case at time $T_2$ in FIG. 3, the start pulse (C) immediately entrains a start pulse (D) from parameter buffer 50 to accelerator core 60, e.g. at time $T_2$.

If the accelerator core is busy which is the case at times $T_4$ and $T_6$ in FIG. 3, parameter buffer 50 waits until it detects a falling edge, at time $T_7$, of the busy signal (E) which is returned from hardware accelerator core 60. At this moment, parameter buffer 50 outputs a second start pulse (D) for the second parameter set, i.e. the parameter set that had been programmed at time $T_3$, to be used by accelerator core 60 in a second processing task. Then, parameter buffer 50 waits again until it detects another falling edge of the busy signal (E), at time $T_8$, to output a third start pulse (D) for the third parameter set, i.e. the parameter set that had been programmed at time $T_5$, to be used by accelerator core 60 in a third processing task, and so on.

Another busy signal (G) is returned from parameter buffer 50 to the processor and is visible to the software running on the processor. While the first busy signal (E) from accelerator core 60 to the parameter buffer really reflects a processing or non-processing state of the accelerator core, this second busy signal (G) passed from parameter buffer 50 to the system processor only reflects an idle state of the accelerator core in the event the parameter buffer 50 is empty.

In a presently preferred embodiment, a status signal is output by parameter buffer 50 to an optional parameter FIFO status register 41 in register interface 40. This status signal (F) may reflect the parameter set that is currently active, the number of empty spaces in the parameter FIFO, a buffer overflow condition or other error condition. This parameter FIFO status register 41 which is also depicted in the detailed block diagram of FIG. 5, is not essential for the basic operation of the accelerator module according to the invention but can be advantageous for debugging and error management purposes.

Figure 4:
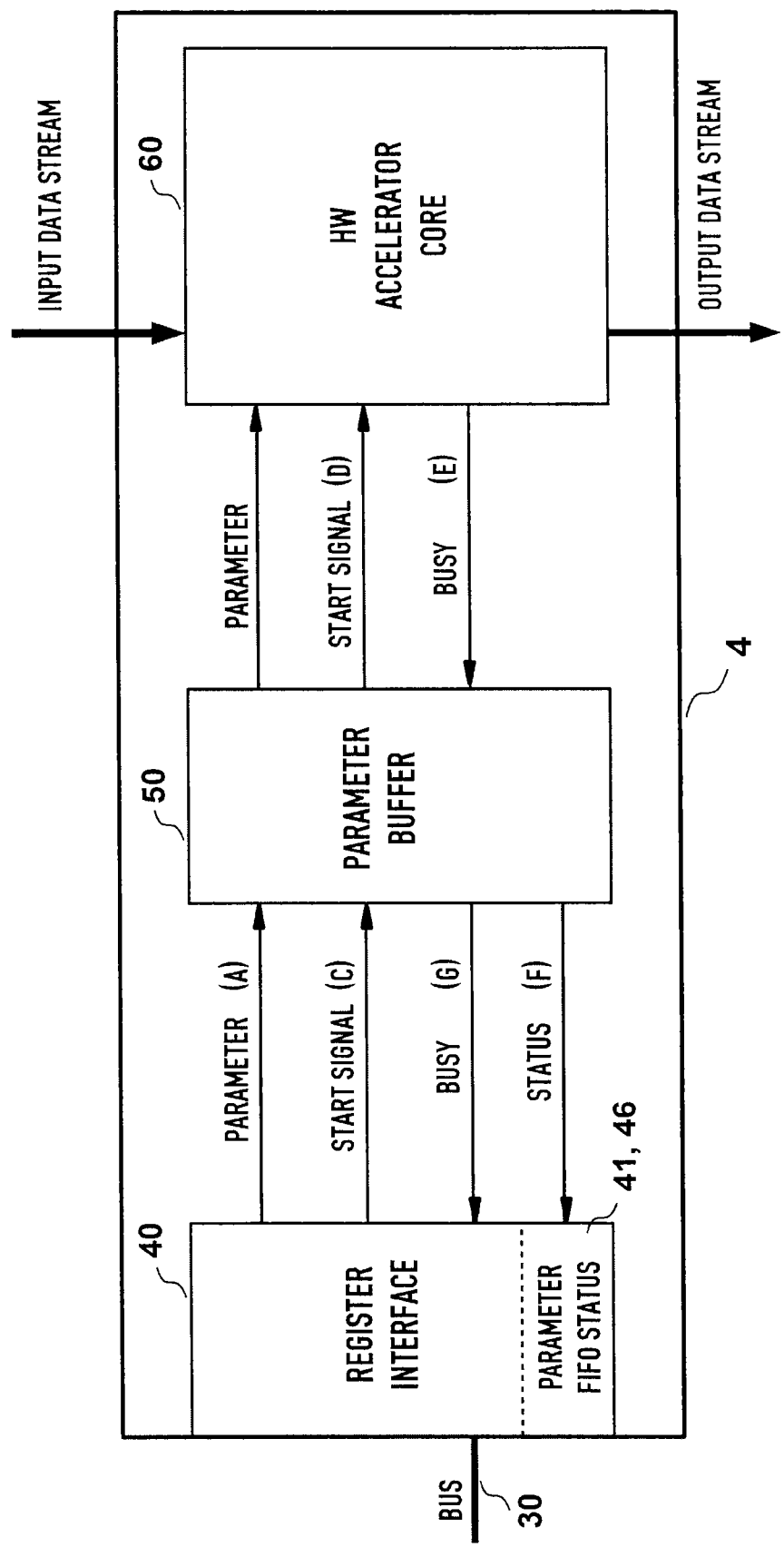
FIG. 4 illustrates a schematic block diagram of a hardware accelerator module according to the invention.
Figure 5:
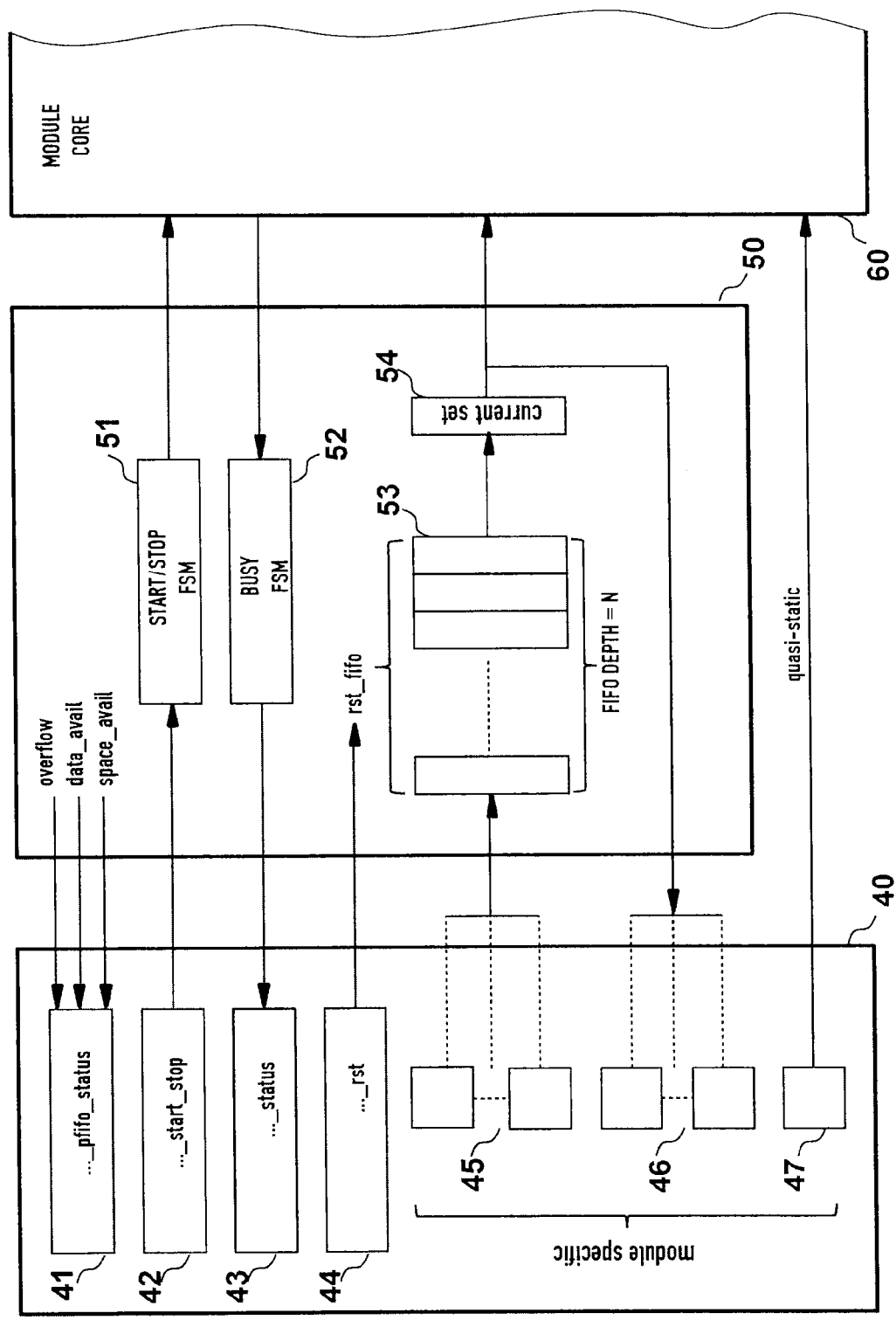
FIG. 5 shows a detailed block diagram of the register interface and parameter buffer of the hardware accelerator module of FIG. 4.

FIG. 5 depicts a detailed block diagram of a preferred embodiment of the register interface and parameter buffer of the hardware accelerator module shown in FIG. 4.

Register interface 40 of the preferred embodiment of an accelerator module shown in FIG. 5 comprises four control registers 41-44 of a standardized type which provide for a common interface and standard behavior. The contents of registers 41-44 are summarized in the table below:

| Register | Field | I/O Signal (cf. FIG. 3) |
|---|---|---|
| start_stop | start | (C) |
| rst | rst_fifo | |
| status | busy | (G) |
| pfifo_status | overflow content_num avail_num | (F) |

Register interface 40 further comprises as many customized parameter registers 45, 46, 47 as required for the processing tasks the accelerator module is intended for.

Parameter registers 45 are provided to receive the sets of parameters from the processor to be passed to the parameter buffer 50.

Parameter registers 46 are intended to hold the parameter set currently provided to the accelerator core at 54, as will be explained below. Parameter registers 46 are optional and provided for debugging purposes. In case of a standstill of the module, for example, it could be helpful to know what set of parameters is currently active.

Moreover, direct connections from registers to the accelerator core are possible, as is shown from register 47. However, there is no synchronization with any streaming data stream streaming through the accelerator module core. Register writes in this case affect the module core's operation immediately, so this is a quasi-static connection.

The parameter buffering block 50 comprises a first finite state machine 51, a second finite state machine 52, a parameter FIFO buffer 53 having a depth N, and a parameter output register 54.

Parameter FIFO 53 receives and consecutively buffers the parameter sets which are written by the system processor into parameter registers 45 and passed to the parameter FIFO, as depicted at (A) in FIG. 3.

Finite state machine 51 receives the start signal (C) from start_stop register 42 and passes another start signal (D) to the accelerator core 60 as described above. Simultaneously with a start pulse (D), the parameter set at the first position in parameter FIFO 53 is passed to parameter output register 54 where the parameters are provided to the accelerator core 60 to perform a defined task on a current streaming data block.

Finite state machine 52 receives and assesses the busy signal (E) from accelerator core 60. A falling edge of signal (E) entrains another start pulse (D), and the parameter set is provided at parameter output register 54.

Finite state machine 52 supplies a busy signal (G) to status register 43. As mentioned before, this busy signal (G) is only low if busy signal (E) is low and the parameter FIFO 53 is empty.

It will be appreciated that the parameter FIFO (pfifo) provides a common platform for a hardware accelerator module to receive parameters from a processor. The proposed implementation as shown in FIG. 5 is completely transparent to the software layer which is to say that the processor that runs the software does not have to be aware of the presence of this parameter buffer. Therefore, the accelerator module of the invention is downwards compatible. An upgrade of an accelerator module with the parameter buffer feature does not require any modification in the hardware design or verification on the hardware accelerator module itself. The parameter buffer is designed in a way to avoid additional parameter latency when the parameter buffer is empty. In this case, the accelerator start pulses (C), (D) and module busy information (E), (G) are fed through without delay.

The parameter buffer is downwards compatible for the software, i.e. existing software can be used with the novel parameter buffer. However, in order to profit from the parameter buffer according to the invention, the software running on the processor has to be modified in a way to write the new parameter configuration without checking the busy status of the accelerator module before.

In situations in which a FIFO overflow is likely to occur during normal operation, the software may check the pfifo_status at 41 to wait until a new parameter set fits into parameter FIFO 53. If the software does not work properly, FIFO overflow may happen and cause malfunction of the hardware accelerator module. In order to detect such an error, it is advantageous to have another status bit in pfifo_status register 41 that indicates a FIFO overflow. Once set, this bit will remain active up to a reset of the hardware accelerator module such that temporary overflows can be detected afterwards.

In yet another embodiment, a FIFO overflow may additionally trigger an error interrupt, for immediate handling of the error event.

Figure 6:
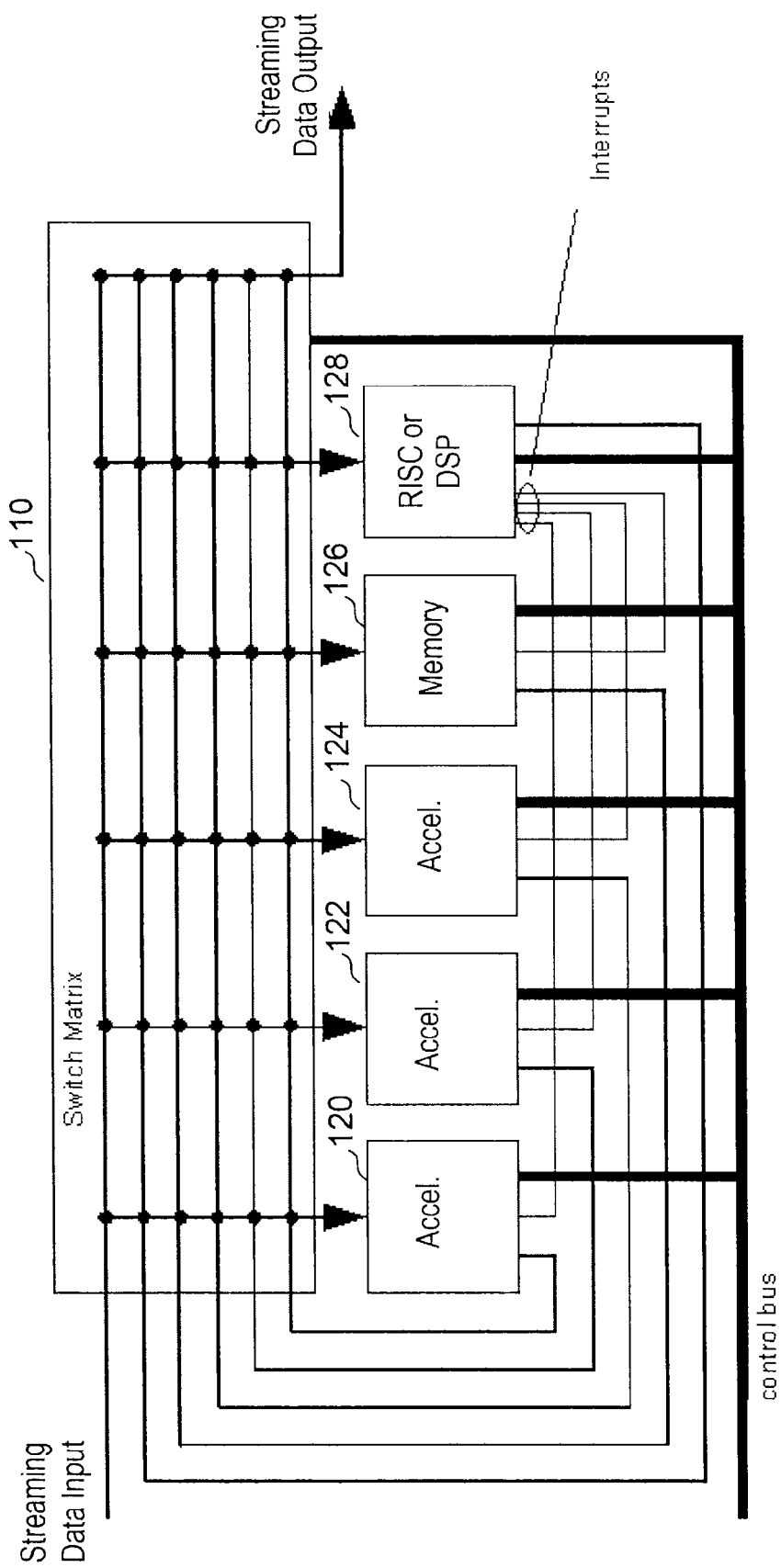
FIG. 6 illustrates the generic architecture of a functional unit of a circuit arrangement in which the invention can be used.

FIG. 6 illustrates a generic architecture of a functional unit of a circuit arrangement in which the invention can be used. This generic architecture of a functional unit has been proposed for a telecommunications modem as disclosed in the applicant's co-pending European patent application "Modem Architecture" (EP 10 197 313.9). The functional units are components of a system-on-chip (SoC). In a telecommunications application, for example, the functional units may constitute components of an LTE layer subsystem of a telecommunications device, in which case the functional units could be any of a digital front end (DFE) unit, LTE Tx unit, shared RAM unit, forward error correction (FEC) data unit, fast Fourier transform (FFT) unit, parameter estimation unit, searcher unit, and FEC control unit, without being limited thereto. It has to be noted that the functional unit of FIG. 6 is merely presented here for illustrative purposes as an application example of the hardware accelerator module according to the invention and is not intended to limit the invention thereto, rather various other applications will be obvious for a person skilled in the art.

A functional unit as represented in FIG. 6 comprises a plurality of hardware modules 120-128 which may include a local RISC or digital signal processor 128, a plurality of hardware accelerators 120-124, and a memory module 126. Also, each of the functional units comprises a switch matrix 110 connected between a streaming data input of the respective functional unit and each of the hardware modules. Each column of six points can be understood as a seven point switch wherein the points represent potential connection points. The switch matrix can be configured at run time. Local processor 128 is adapted to receive task instructions from a higher level controller over a control bus system using a first protocol. The first protocol includes addressing and may be a AHB based protocol. The local processor 128, in response to the task instructions from the controller, may be adapted to configure the switch matrix 110 to selectively produce connections between the streaming data input and hardware modules 120-126 in a manner to perform the dedicated task on the data that are streamed through the functional unit on a streaming data path as defined by the switch matrix. It should be noted here that the presence of processor 128 is optional; alternatively the configuration of the switch matrix of an individual processing unit may be controlled by a higher level controller of the circuit arrangement connected via the control bus.

Hardware accelerators 120-124 in FIG. 6 can advantageously be configured as described above in conjunction with FIGS. 3 to 5 and can be programmed with parameter sets by local processor 128 or by a higher level processor.

Since with the inventive configuration of a hardware accelerator module, parameter data can be calculated and provided to the respective hardware accelerator in advance, an immediate reaction of the processor upon completion of a processing task by a hardware accelerator is dispensable, so processor load peaks due to hardware interrupts can be reduced.

The invention claimed is:

1. A hardware accelerator module driven by a system processor via a system bus to sequentially process data blocks of a data stream as a function of a parameter set defined by the system processor, the hardware accelerator module comprising:

a register interface block adapted to receive at least one parameter set from the system processor;

an accelerator core adapted to receive streaming data, to process data blocks of said streaming data in a manner defined by the at least one parameter set, and to output the processed streaming data; and a parameter buffering block to receive the at least one parameter set from the register interface block, adapted to consecutively store the at least one parameter set, and to sequentially provide the at least one parameter set to the accelerator core as a function of a busy state received from the accelerator core; the parameter buffering block further adapted to provide a signal to the system processor indicative of a non-busy state of the accelerator core when the parameter buffering block is empty and the accelerator core is idle; the parameter buffering block including first and second finite state machines, a buffer for storing the at least one parameter set, and a parameter output register coupled to the buffer and to receive the at least one parameter set, the parameter output register to provide the at least one parameter set to the accelerator core.

2. The hardware accelerator module of claim 1, wherein the first finite state machine adapted to receive a first start pulse from the register interface block and in response thereto to pass another start pulse to the accelerator core as soon as a non-busy condition of the accelerator core is determined;

the second finite state machine adapted to receive and assess a first busy signal from the accelerator core to determine a non-busy condition thereof, and to pass a second busy signal to the system processor;

the buffer being a FIFO buffer having a depth N, for storing N parameter sets; and the parameter output register adapted to provide the at least one parameter set to the accelerator core simultaneously with the another start pulse;

wherein said second busy signal only reflects a non-busy state to the processor if the first busy signal indicates a non-busy condition and the FIFO buffer is empty.

3. A method for setting up a hardware accelerator module, comprising the steps of:

writing, by a system processor, a first parameter set into the hardware accelerator module which first parameter set defines a first processing task of a hardware accelerator core, and emitting a first start pulse;

consecutively writing, by the system processor, a second parameter set into the hardware accelerator module which second parameter set defines a second processing task of the hardware accelerator core, wherein the writing step occurs independently from a busy status of the hardware accelerator core, and emitting a second start pulse;

sequentially buffering the parameter sets in a parameter buffer;

monitoring, by said parameter buffer, a first busy signal from the hardware accelerator core of the hardware accelerator module;

in case the hardware accelerator core is not busy, immediately passing a start pulse to the hardware accelerator core in response to the first start pulse, and providing a first parameter set to the hardware accelerator core;

in case the hardware accelerator core is busy, buffering the start signal until a non-busy indication is detected from the hardware accelerator core, and the start pulse to the hardware accelerator core and providing the first parameter set to the hardware accelerator core in response to said non-busy indication;

providing, by said parameter buffer, a signal to the system processor indicative of a non-busy state of the hardware accelerator core when the parameter buffer is empty and the hardware accelerator core is idle; and returning a second busy signal to the system processor wherein said second busy signal only indicates a non-busy state of the hardware accelerator module if the first busy signal indicates a non-busy condition of the hardware accelerator core and there is no further parameter set buffered in the parameter buffer, and otherwise indicates a busy state.

4. The method of claim 3, further comprising the step of registering a status signal which indicates at least one status of the parameter buffer of a group of status indications including the parameter set currently used, the space available in the parameter buffer, and a buffer overflow condition.

* * * * *